(12) United States Patent
Fevre et al.

(10) Patent No.: US 6,510,784 B1
(45) Date of Patent: Jan. 28, 2003

(54) MECHANICAL SAFETY DEVICE FOR FOOD PROCESSING APPLIANCE

(75) Inventors: Loic Fevre, Sanvignes-les-Mines (FR); André Gateaud, Montceau-les-Mines (FR); Pierre Perrin, Sanvignes-les-Mines (FR)

(73) Assignee: Robot Coupe, Vincennes (FR)

( * ) Notice: Subject to any disclaimer, the term of this patent is extended or adjusted under 35 U.S.C. 154(b) by 21 days.

(21) Appl. No.: 10/018,533

(22) PCT Filed: Apr. 17, 2001

(86) PCT No.: PCT/FR01/01174
§ 371 (c)(1),
(2), (4) Date: Feb. 26, 2002

(87) PCT Pub. No.: WO01/79746
PCT Pub. Date: Oct. 25, 2001

(30) Foreign Application Priority Data

Apr. 18, 2000 (FR) .............................................. 00 04966

(51) Int. Cl.⁷ .......................... A23N 1/00; A47J 43/046; A47J 43/07; B02C 18/16; A23L 1/00
(52) U.S. Cl. .......................... 99/492; 99/510; 241/37.5; 241/92
(58) Field of Search .......................... 99/492, 509–513, 99/337, 338; 366/206, 601; 201/37.5, 92, 282.1; 426/518

(56) References Cited

U.S. PATENT DOCUMENTS

| 3,892,365 | A | * | 7/1975 | Verdun | 241/92 |
| 4,674,690 | A | | 6/1987 | Ponikwia et al. | 241/37.5 |
| 4,821,968 | A | | 4/1989 | Fleche | 241/37.5 |
| 5,454,299 | A | * | 10/1995 | Gonneaud | 99/492 |
| 5,544,573 | A | * | 8/1996 | Gateaud | 99/492 |
| 6,202,547 | B1 | * | 3/2001 | Tseng | 99/511 |

FOREIGN PATENT DOCUMENTS

FR          2 147 361          3/1973

* cited by examiner

Primary Examiner—Timothy F. Simone
(74) Attorney, Agent, or Firm—Duane Morris LLP

(57) ABSTRACT

A safety device for a food processor having a bowl closed by a cover and fed through a chute for introducing products into the working bowl, has a control switch responsive to the position of a pusher guide carrying a pusher. The pusher is slidably mounted for translation in the pusher-guide. The pusher-guide is pivotally mounted to cover over the open end of the chute, and a set of rods connect the pusher-guide to the switch operating safety rod extending along the bowl. The device prevents access of the user's hand to the cutting area, even for a large chute, by blocking the chute when the motor is enabled.

6 Claims, 5 Drawing Sheets

MECHANICAL SAFETY DEVICE FOR FOOD PROCESSING APPLIANCE

FIELD OF THE INVENTION

The invention relates to a safety device designed in particular, but not exclusively, for food cutting apparatus.

BACKGROUND OF THE INVENTION

Food cutting apparatus known in the field, such as vegetable cutters or meat/vegetable cutter units, have among other things, a motor unit enabling control and motorization of a cutting tool and a device, commonly called a vegetable cutter head, for feeding and cutting the food products. The vegetable cutter head may have a bowl that is removable or integrated with the motor unit, of a suitable shape. The apparatus may or may not be arranged for continuous discharge of the treated products (closed bowl or open bowl). Typically, a cutting disk or tool is located inside the bowl and is moved by the motor to make the desired cuts (slicing, grating, etc.). The bowl has a cover, and may have a discharging disk.

The cover enables introduction of food products to be processed. Food products are fed through the cover by guiding them through one or a plurality of vertical tubes or chutes. The cover also protects the user by preventing ejection of the processed product outside the bowl and, above all, by precluding the user from being cut by touching the moving disk.

Introduction of food products into the machine is accomplished by positioning them in a suitable chute and by pushing them against the disk with the help of a pusher. Removing the pusher leaves the disk exposed at the lower end of the chute. For chutes large enough to admit an appendage of the user, it is advisable, if it is desired to protect the user from risk of injury, to permit operation of the motor only when a physical element is present to block the chute inlet.

It is known by FR-A-2 147 361 (VERDUN) to provide a mechanical safety device responsive to the presence of the cover on the bowl, this safety being obtained by means of a sliding rod arranged along a line with the bowl. The lower part of the rod comes to bear when the cover is positioned against a switch included in the base, and operated by action of a cam carried by the cover. This sort of device does not provide suitable chute safety and Instead, safety is addressed by providing chutes that have a long length and/or a limited cross-section to prevent user contact with the cutting disk.

A device for magnetically accomplishing this control function between the pusher and the motor drive is known by U.S. Pat. No. 4,821,968 and uses a set of magnets and reed (flexible blade) switches, or switches of the Hall effect type. This device relies on an electrical response; and, moreover, control using a magnetic field is perhaps more delicate than desired for considerations of safety.

Mechanical devices are already known which consist in operating a power circuit breaker only when the chute pusher is in a safe position. Such a device is described in U.S. Pat. No. 4,674,690 in which the chute is surrounded by a sleeve provided with means for activating the power circuit breaker, in which the pusher is enclosed.

The present invention seeks to cope with all these problems in a control between a pusher, which pushes the products inserted in the chute, and the drive of the motor. This mechanical solution permits safe use of a chute having a large cross section (e.g., as big as a person's hand).

According to the invention, a safety device is provided for a food processor with a rotating tool, an electrical motor unit on which is mounted a bowl that is closed by a cover, a motor shaft passing through the bottom of the bowl, and wherein the device can receive various tools. The cover defines a chute, and carries a safety rod arranged along a line with the bowl and operating a switch arranged in the power circuit of the motor unit. According to an inventive aspect, the pusher is guided for translation in a pusher-guide. The pusher-guide is articulated at the top of the chute and is mechanically connected to push against the top of the safety rod, such that a small pivoting of the pusher-guide from its lowered position causes stoppage of the motor.

The invention provides a mechanical safety device for a food processor of a type that may require action by the user to advance food products for cutting. The device is associated with a motor unit on which an optionally-removable bowl is arranged and is closed by a cover, the cover likewise optionally being removable from the bowl. The device controls the motor based on the position of one or more movable parts, for preventing access to an area of potential injury to the user, while the motor is on. In one embodiment, a pivoting movable part is formed by a pusher-guide, that may or may not be free to pivot while a pusher is sliding in the pusher-guide. The upper portion of the chute is safely obstructed when the motor is on, either by means of the pusher itself, or by the pusher-guide. The pusher generally has a reduced cross section, and at a lower end carries a plate having a cross section which is substantially equal to that of the chute. The pusher handle freely slides in the pusher-guide. The plate at the end of the pusher can be extracted from the chute only when the plate is lifted out of the chute by pulling on the handle.

Pivoting of the pusher-guide causes translation of a connecting rod, the lower end of which bears against the upper part of a safety control rod of the bowl. Pivoting of the pusher guide can be accomplished only when the pusher plate is retracted into abutment against the pusher-guide.

The result is a control of the drive of the motor based on the position of a movable part that obstructs manual access to the area of cutting risk, safely permitting use of a chute defining an aperture with a large cross section.

According to another feature of the invention, the pusher-guide drives a connecting rod by means of a first articulation. By means of an articulation at its second end, the connecting rod forces rotation of a crankshaft around a second pin that is fixed with respect to the cover. The crankshaft in turn drives a first rod, by means of its first articulation which is common with said connecting rod. This first rod acts on a switch located in the motor housing unit through the second rod, guided for translation in a line along the wall of the bowl. The second rod is returned upwardly by a spring.

A mechanical device as described is economical and can directly act on an electric switch that couples or decouples currents compatible with the motor. Therefore, the apparatus is very simple and reliable and its manufacturing cost is more moderate than that of other safety devices.

The pusher is connected to the cover of the vegetable cutter by means of an intermediate part called the pusher-guide. The pusher-guide pivots around a horizontal pin which is positioned at the upper part of the chute and permits translation of the pusher. If the pusher is in the chute, food products are introduced by first drawing the pusher up to the upper level of the chute, and then pivoting the pusher-guide free of the inlet of the chute. When the chute is filled with food products to be processed, downward pressure is exerted on the products after causing the pusher-guide to pivot back so that the pusher is over the top of the chute, and then causing the pusher to vertically descend in the chute. Closing the guide and lowering the pusher pushes the product against a tool such as a cutting disk. The process is repeated by raising and removing the pusher, refilling the chute, etc.

Controlling motor operation based on the position of the pusher-guide ensures that the motor does not operate unless the pusher is obstructing the inlet of the chute. An assembly of rods, arranged between the cover and the pusher-guide, controls a safety switch which is placed near the motor. The translation movement produced by the pusher guide is transmitted by the safety rod in the bowl to activate the switch. A return spring can returns the rod to an upper position when the pusher-guide is not in the working position.

According to the inventive kinematics described herein, two joint problems of with this type of system are solved:

When the pusher-guide is closed, the system advantageously exerts a resisting force to opening, which is enough to permit raising of the pusher without driving open the pusher-guide until the pusher is completely raised. Otherwise, rocking of the pusher-guide before the pusher is fully retracted will produce rubbing of the pusher against the sides of the chute. Such rubbing at least is detrimental to ergonomics, and may lead to complete blocking of the mechanism by buttressing. At the same time, the resistance force against opening must not be too high since it would then be a constraint for the user.

The system should stop the motor even when the pusher-guide is not rocked very much, i.e., well before it becomes possible for the user's hand to obtain access to the tool. It is therefore advantageous for the mechanism to produce a relatively robust stroke of the rod contained in the cover, responsive to a small angular displacement in the direction of clearance of the pusher-guide.

A small upward pivoting of the pusher-guide of the chute from its lowermost position causes the motor to stop. When preparing to lower the pusher into the chute, it is possible to enable operation of the motor while permitting the products being processed initially to protrude slightly above the upper end of the protected chute.

BRIEF DESCRIPTION OF THE DRAWINGS

Other features and advantages of the invention will be revealed during the following description of a particular embodiment given only as a non-limiting example, with respect to the drawings which show.

DETAILED DESCRIPTION

In all the figures, the same reference numbers are used to designate the same items.

Figure 1:
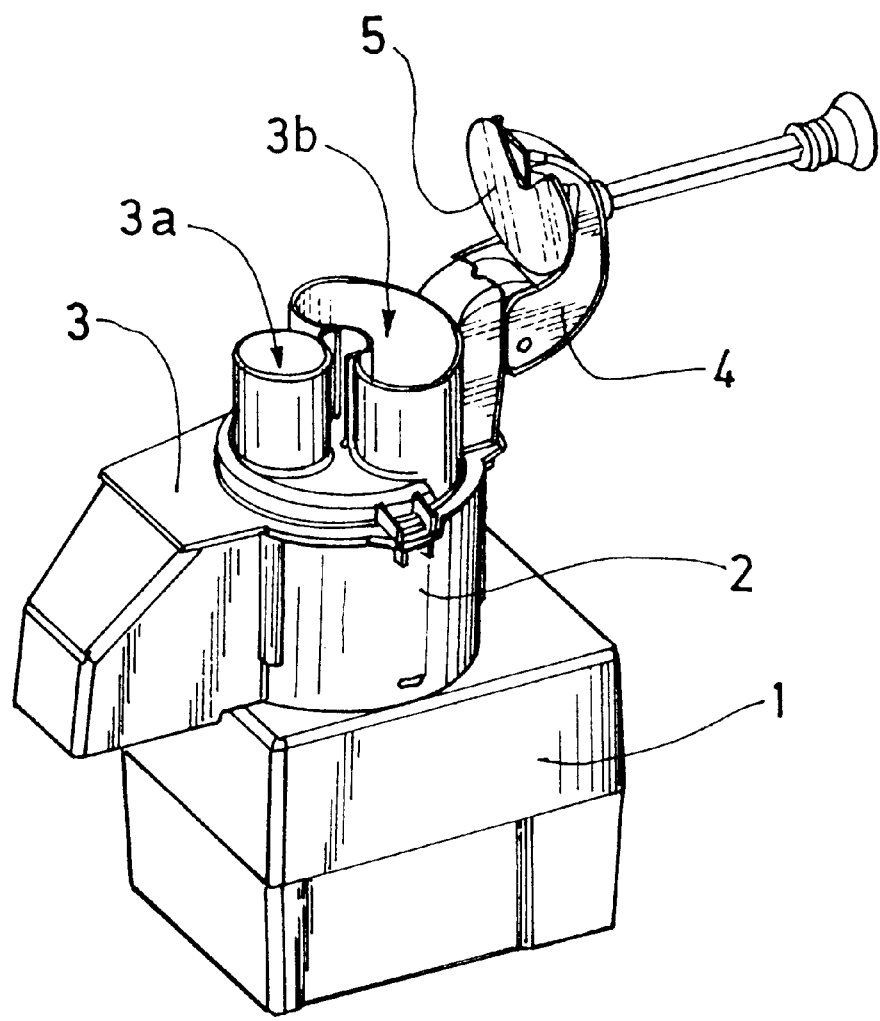
FIG. 1, a perspective view of a complete machine.

FIG. 1 shows the full machine. The mechanism necessary to kinematics is protected from spills by an assembly of suitable hoods.

In FIG. 1, the base 1 encloses a motor (not shown) and supports the bowl 2. The bowl is closed by the cover 3, which comprises a smaller chute 3a, and a larger chute 3b, inside of which may penetrate a pusher 5 which slides in a guide 4.

Figure 2:
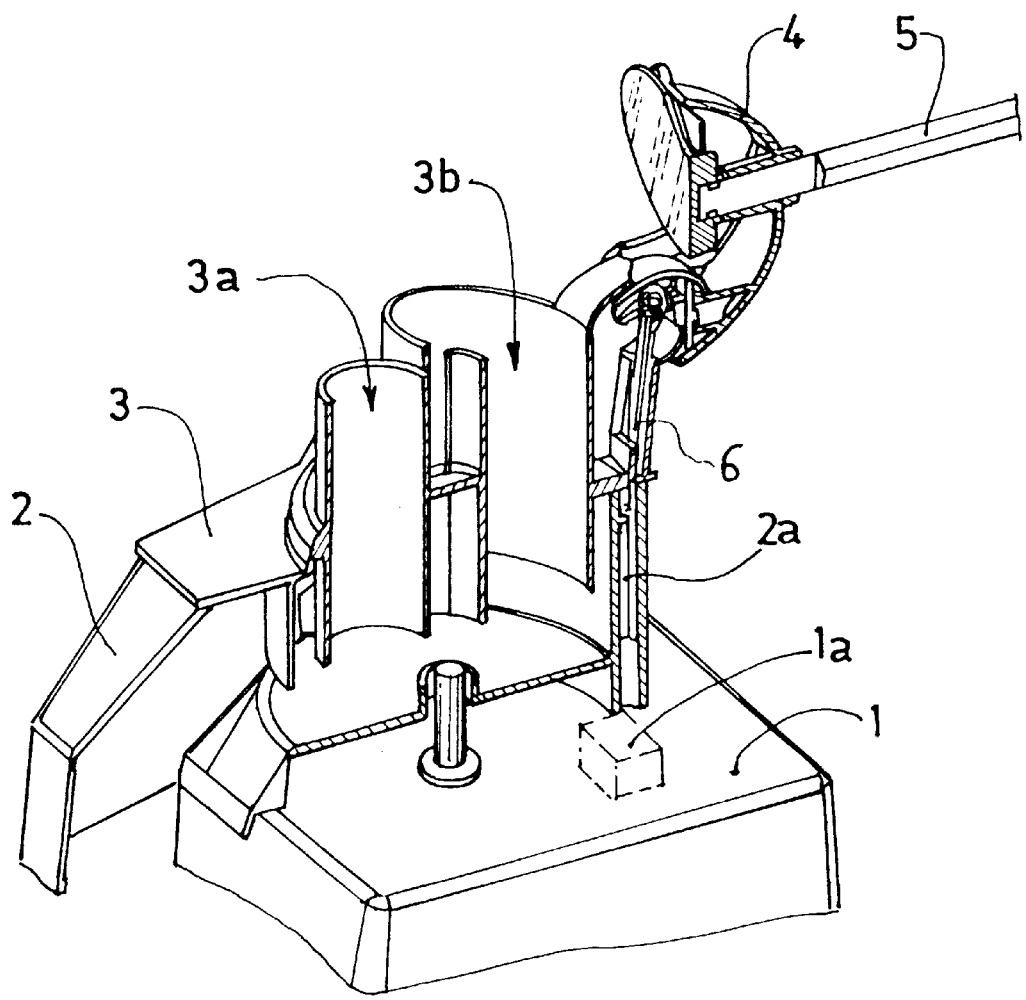
FIG. 2, a split perspective and half cross-sectional view placed side by side.

FIG. 2 shows a cross-section through the vegetable cutter head. The small chute 3a, which is smaller for example than an hand, does not need a safety device. The larger chute 3b is protected by the safety aspects of the invention. The head is shown in a position ready for filling the greater chute 3b. In FIG. 2, a safety switch 1a is arranged inside the base 1, beneath a safety rod 2a that is mounted to slide along a line of the bowl 2. The rod 6 of the cover acts on the safety rod 2a, and hence on the switch 1a.

FIGS. 3 to 8 are diagrams and drawings showing the mechanism that transfers pivoting movement of the pusher-guide 4 into a vertical translation movement of the rod 6 which is mounted in a wall of the bowl 2. Vertical translation of rod 6 results from pivoting the pusher-guide 4, after having retracting the pusher to the top of the chute.

The pusher-guide 4 is articulated on a pin 4a that is fixed with respect to the cover 3. The pusher-guide 4 carries a pin 8b on which is articulated an end of a connecting rod 8. The second end of the connecting rod 8 is articulated on one end 7b of a crankshaft 7. The second end 7a of crankshaft 7 is articulated in a fixed point 7a of the cover 3. On the end 7b is also articulated one end of the rod 6, the other end of which is guided in an aperture 3c of the cover, and acts on the safety rod 2a which is slidably mounted in the bowl.

Pivoting the pusher-guide 4 moves the pin 8b, the pin 7a being fixed. The distances between 7a and 7b and respectively 7b (or 8a) and 8b being constant, the point 7b (8a) describes an arc of a circle around 7a. The upper end of the rod 6, which is fixed at 7b, follows the same movement. Moreover, rod 6 is guided in translation by means of the aperture 3c in the cover. Pivoting pusher guide 4 thus results in verticaldisplacement of the lower end 6a of rod 6. A spring 2b biases rod 2a upwardly (FIG. 6) and thus ensures contact between the upper part of the rod 2a and the lower end of rod 6. The bowl safety rod 2a is vertically displaced, up to the clearance available from movement of the pusher-guide 4 in either direction.

Figure 4:
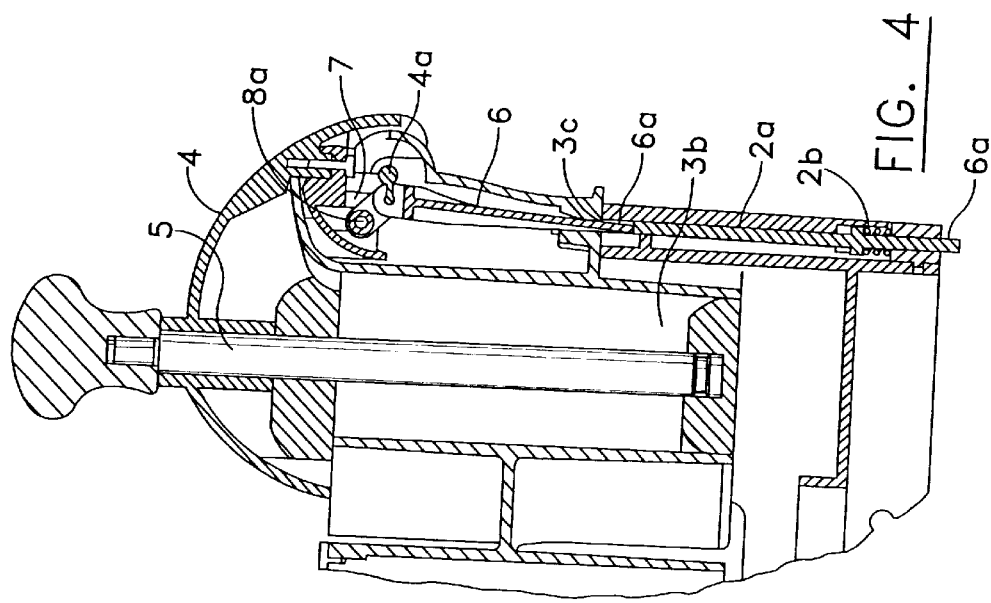
FIG. 4, a drawing in cross section of the mechanism in the condition described in FIG. 3.
Figure 3:
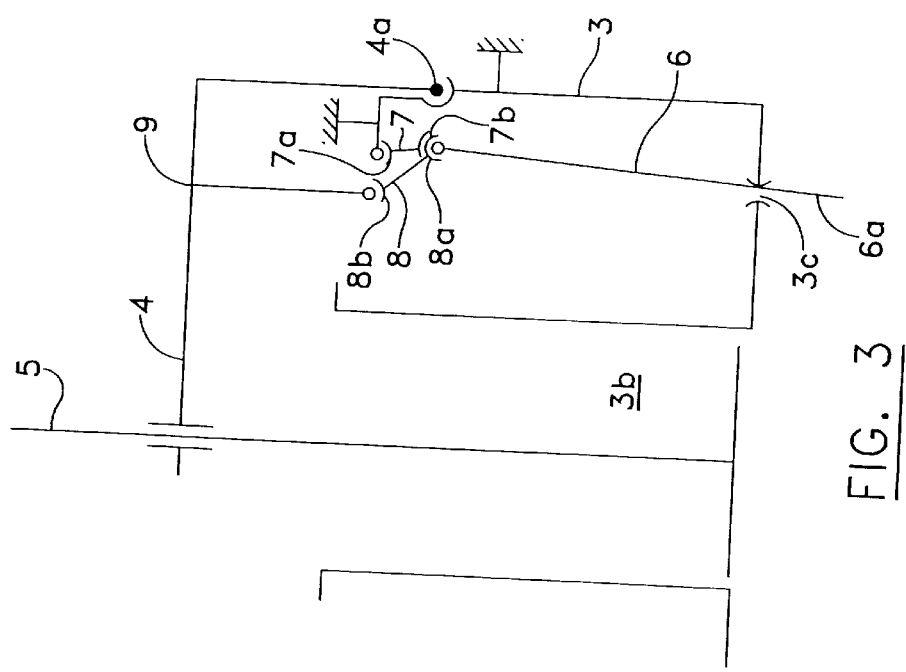
FIG. 3, a diagram of the mechanical device which provides, according to the invention, action of the pusher against the rod of the bowl, while the pusher descends.

In FIGS. 3 and 4, the pusher-guide is closed and the pusher is descended to the bottom of chute 3b. FIGS. 3 and 4 thus show the position of the assembly when the user has pushed the products through the chute 3b. When the pusher 5 is in its lower position, rod 6 pushes on the top of the safety rod 2a which closes the switch 1a. For returning to its opening position, it is necessary to raise the pusher 5, and then to pivot the pusher-guide 4 in the clockwise direction.

The diagram of FIG. 3 shows how the device exerts a force on the pusher-guide to resist opening. When the pusher-guide is closed, the crankshaft 7, which has rotated slightly beyond a vertical position, exerts, by means of its pin 7b, a traction on the connecting rod 8. Connecting rod 8, in turn, tends to maintain the pusher-guide 4 closed by its connection 8b, under action of the spring 2b (FIG. 4) as transmitted to the rod 6 by means of the rod 2a.

Figure 6:
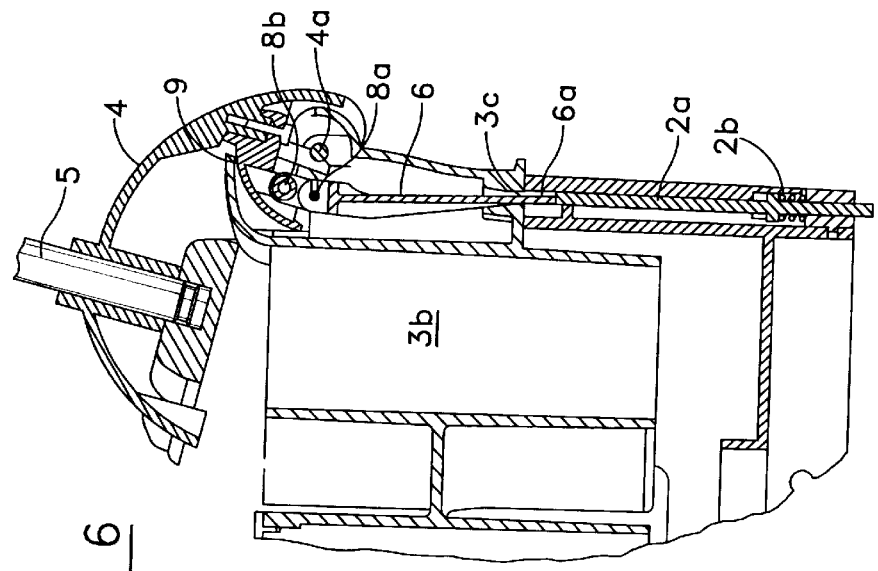
FIG. 6, a drawing in cross-section for the mechanism in the condition described in FIG. 5.
Figure 5:
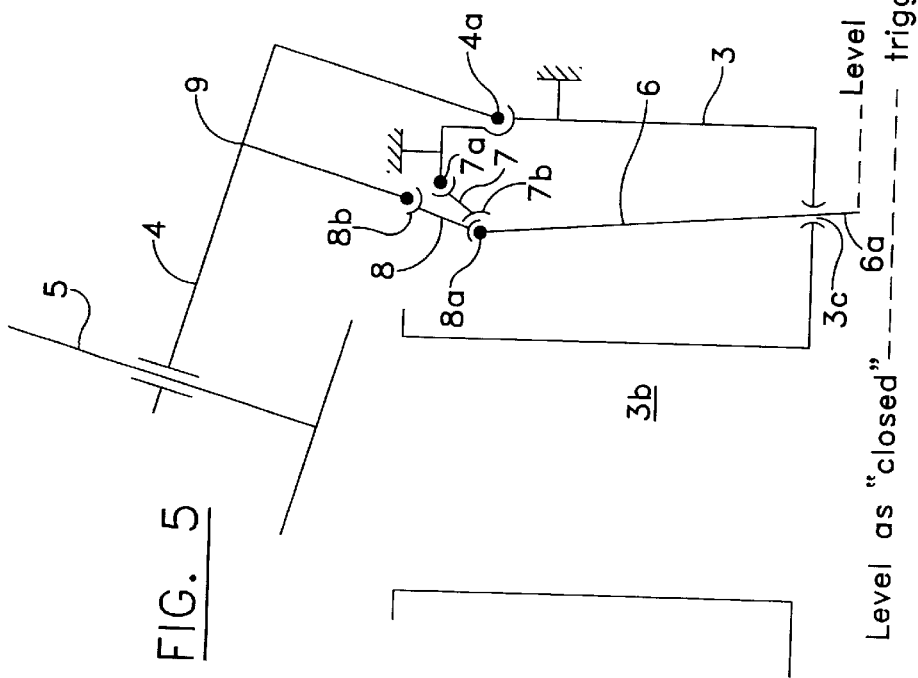
FIG. 5, a diagram with the pusher being raised immediately when the device causes the motor to stop.

In FIGS. 5 and 6, the pusher 5 has been fully raised from the chute 3b and the pusher-guide 4 has been pivoted to an intermediate position in the clockwise direction. This is the position in which safety switch 1a is open, and clearly shows that when access of the user's hand to the tool is possible, the motor is stopped.

FIGS. 5 and 6 specify the position of the system when the rod 6 is sufficiently raised so that the rod 2a disengages from the switch 1a, which results in stopping the motor. In the opposite direction for closing the pusher, this is also substantially the position at which it is possible to re-start the motor. This feature of the device makes it possible to fill 100% of the volume of the chute 3b with products to be processed, and maximizes performance of the apparatus.

Figure 8:
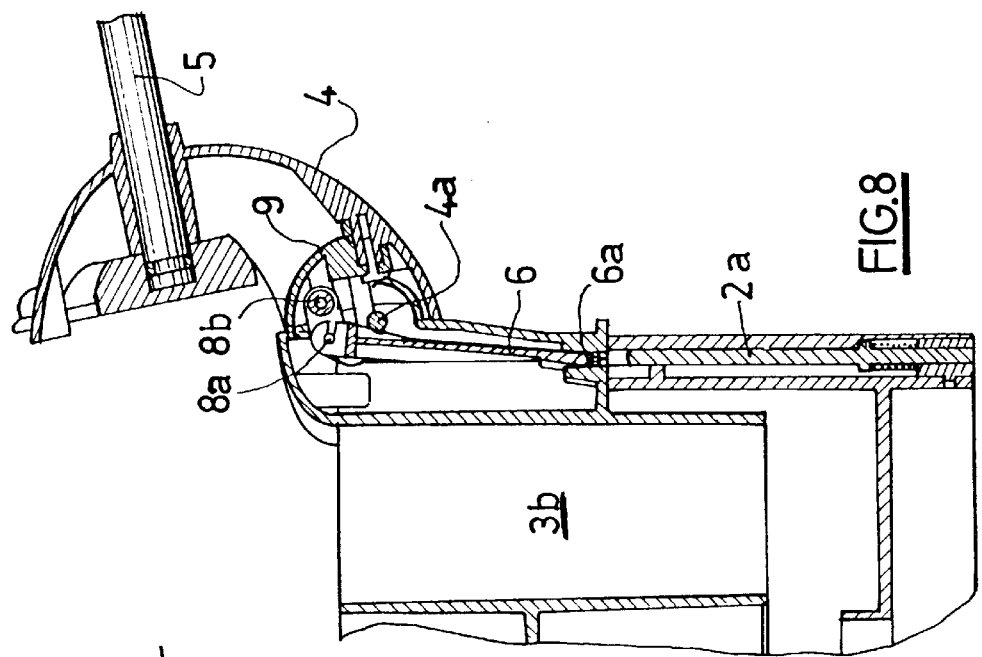
FIG. 8, a drawing in cross-section of the mechanism in the condition described in FIG. 7.
Figure 7:
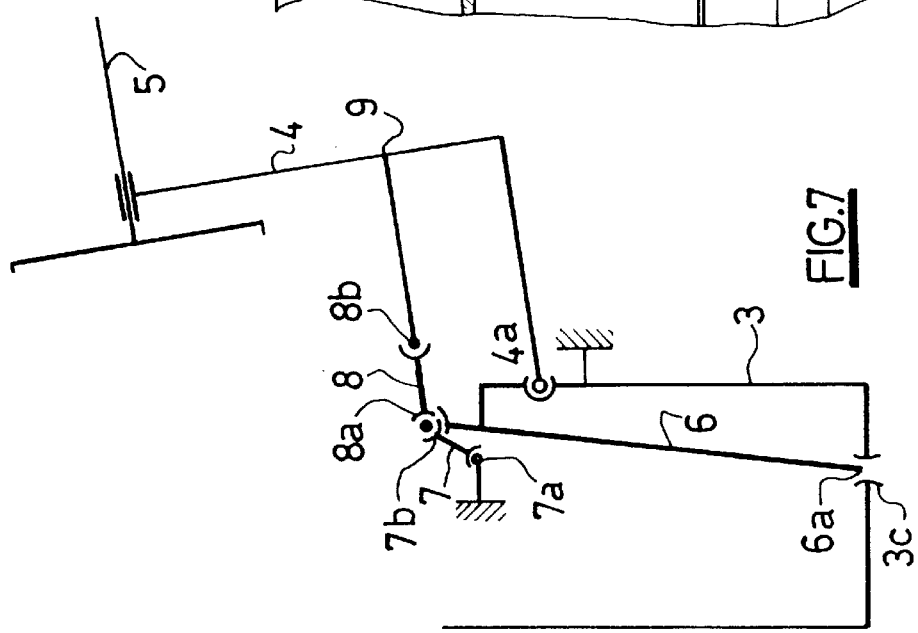
FIG. 7, a diagram with the pusher completely open.

FIGS. 7 and 8 show the device in its completely open position with the pusher completely raised/retracted. In this position there is direct access to all the surfaces of the chute.

In FIGS. 7 and 8, the pusher-guide 4 has continued to rotate in the clockwise direction, reaching its maximum opening angle. The pusher 5 is completely free the aperture of the chute 3b, which can very easily be refilled with products to be processed.

Since the pusher-guide is articulated on a pin 4, contact of the rod 2a on the switch 1a is made when the lower surface of the pusher-guide 4 forms an angle of about 10° with horizontal in the clockwise direction and is interrupted when the lower surface of the pusher-guide forms an angle of about 11° in the counter-clockwise direction. This means that a small pivoting of the pusher-guide is sufficient to interrupt the contact between the rod 2a and the switch 1a, and decouple the motor from the electrical power. In the direction for obstructing the chute, switching action slightly before closing enables operation operate when food, for example vegetables having an irregular shape, protrude slightly above the inlet level of the chute. Thus, the chute can be loaded at its maximum capacity.

A significant advantage of the inventive safety system is the possibility to use a cylindrical chute, or a chute having another shape of a surface equal to that of the pusher, over a height equal to the stroke of the pusher. Thus the worked volume is optimal.

Another advantage is that the products loaded into the chute can slightly protrude beyond the upper edge without disabling operation. This avoids undue attention to setting the top edge of the load of products below the edge of the chute, thus increasing greatly the easiness of use. The safety system is mechanically simple, compared to the prior art, and thus in addition to the already mentioned advantages, has increased reliability.

It is obvious that various variants may be brought into effect, in particular by substitution of equivalent technical means, without therefor departing from the scope of the invention.

What is claimed is:

1. A safety device for a food processor with a rotating tool driven by an electrical motor unit on which is mounted a bowl that is closed by a cover, the device comprising:

a chute for introducing food, a safety rod bearing on a switch arranged in the circuit of the motor unit, a pusher guided for translation in the chute by a pusher-guide, wherein the pusher-guide is articulated to place the pusher at a top of the chute and is mechanically connected to push the safety rod, the mechanism causing the motor to stop upon a small angular clearance of the pusher-guide.

2. The safety device according to claim 1, wherein the chute has a generally cylindrical shape, and the pusher defines a surface substantially equal to a cross section of the chute.

3. The safety device according to claim 1, wherein the pusher-guide drives a connecting rod by means of an articulation, which connecting rod forces, by means of the articulation, rotation of a crankshaft around a pin that is fixed with respect to the cover, said crankshaft driving in turn, by means of the articulation, a rod which acts on the switch, the switch being located in the motor unit and operated through the rod, the rod being guided for translation relative to a wall of the bowl, the rod being upwardly returned by a spring.

4. The safety device according to claim 1, wherein upon closing the pusher-guide on the chute, the motor is enabled provided that the pusher-guide is within a predetermined inclination angle relative to a closed position, and wherein the predetermined inclination angle permits the products to protrude beyond an upper level of the chute.

5. The safety device according to claim 1, wherein the pusher-guide is mounted by mechanics that exert a resisting force to displacement of the pusher from a closed position on the chute, whereby the pusher can slide in the pusher-guide without causing said pusher-guide to pivot.

6. The safety device according to claim 1, wherein the pusher-guide is articulated on a pin, and contact of the rod on the switch is established when the pusher-guide forms an angle of about 10° relative to a closed position and said contact is interrupted when the pusher-guide forms an angle of about 11°.

* * * * *